US012125358B2

United States Patent
Shyu et al.

(10) Patent No.: US 12,125,358 B2
(45) Date of Patent: Oct. 22, 2024

(54) ASSEMBLIES, SYSTEMS, AND METHODS OF MONITORING PERSONAL PROTECTION EQUIPMENT

(71) Applicant: Eaton Intelligent Power Limited, Dublin (IE)

(72) Inventors: Brian Shyu, McKees Rock, PA (US); Eric Matthew Atha, Beachwood, OH (US); Srinivas Surya Satya Kanaka Garimella, Pittsburgh, PA (US); Benjamin Hannigan, Cheswick, PA (US)

(73) Assignee: Eaton Intelligent Power Limited, Dublin (IE)

( * ) Notice: Subject to any disclaimer, the term of this patent is extended or adjusted under 35 U.S.C. 154(b) by 70 days.

(21) Appl. No.: 18/247,839

(22) PCT Filed: Oct. 5, 2021

(86) PCT No.: PCT/EP2021/025387
§ 371 (c)(1),
(2) Date: Apr. 4, 2023

(87) PCT Pub. No.: WO2022/073641
PCT Pub. Date: Apr. 14, 2022

(65) Prior Publication Data
US 2023/0377436 A1 Nov. 23, 2023

Related U.S. Application Data

(60) Provisional application No. 63/087,664, filed on Oct. 5, 2020.

(51) Int. Cl.
*G08B 21/04* (2006.01)
*G08B 21/18* (2006.01)

(52) U.S. Cl.
CPC ..... *G08B 21/0446* (2013.01); *G08B 21/0453* (2013.01); *G08B 21/18* (2013.01)

(58) Field of Classification Search
CPC ............ G08B 21/0446; G08B 21/0453; G08B 21/18; F16P 3/14
See application file for complete search history.

(56) References Cited

U.S. PATENT DOCUMENTS

2011/0006894 A1 1/2011 Witwer
2021/0350312 A1* 11/2021 Swift ............... G06Q 10/06313
(Continued)

FOREIGN PATENT DOCUMENTS

| WO | WO 2018094520 A1 | 5/2018 |
| WO | WO 2019051349 A1 | 3/2019 |
| WO | WO 2019244125 A2 | 12/2019 |

OTHER PUBLICATIONS

International Search Report and Written Opinion for International Application No. PCT/EP2021/025387 mailed on Feb. 3, 2022, 9 pages.

*Primary Examiner* — An T Nguyen
(74) *Attorney, Agent, or Firm* — Baker Botts L.L.P.

(57) ABSTRACT

A PPL monitoring assembly for a hazardous environment is provided. The PPL monitoring assembly includes one or more sensors embedded in a wearable item, the one or more sensors including at least one of a temperature sensor or an accelerometer configured to measure a parameter of at least one of a wearer of the wearable item or the hazardous environment. The PPL monitoring assembly further includes an alert device configured to provide an alert, and a monitoring computing device in communication with the one or more sensors and the alert device, the monitoring computing device including at least one processor in communication with at least one memory device.

18 Claims, 13 Drawing Sheets

(56) References Cited

U.S. PATENT DOCUMENTS

| | | |
|---|---|---|
| 2022/0013000 A1* | 1/2022 | Ding .................... H04L 12/1895 |
| 2022/0256257 A1* | 8/2022 | Awiszus ................. A62B 27/00 |
| 2023/0084106 A1* | 3/2023 | Sobol ..................... G08B 21/22 |
| | | 340/5.61 |
| 2023/0218935 A1* | 7/2023 | Nowicki ............... F16B 45/028 |
| | | 182/3 |
| 2023/0377447 A1* | 11/2023 | O'Connell ......... G08B 21/0423 |

\* cited by examiner

ASSEMBLIES, SYSTEMS, AND METHODS OF MONITORING PERSONAL PROTECTION EQUIPMENT

CROSS REFERENCE TO RELATED APPLICATIONS

This application claims the benefit of U.S. Provisional Application Ser. No. 63/087,664 filed Oct. 5, 2020, the disclosure of which is hereby incorporated by reference in its entirety.

BACKGROUND

The field of the disclosure relates generally to personal protection equipment (PPE) monitoring systems, and more particularly to assemblies, systems, methods of computer-implemented intelligent PPE monitoring.

A variety of different types of PPE exist that is required by a host of healthcare, industrial, utility, and trade workers to provide a degree of protection from known risks in the hazardous environments where they work. When used with appropriate and detailed safety protocols defining the specific items of PPE (e.g., protective suit, face shield, and gloves) needed for certain environments or for certain tasks within such environments, and also for the proper use thereof, enhanced worker safety in otherwise hazardous environments can be desirably realized.

Challenges remain, however, in effectively overseeing the proper use of PPE by personnel in a hazardous environment. While conscientious and well-trained workers will follow PPE protocols, occasional carelessness and mistake can be expected, with potentially severe consequences. Also, the personal wellness of workers may contribute to carelessness and mistake by certain workers. In some cases, personal wellness may be part of the safety protocols in place to discourage unhealthy employees from performing certain tasks. An ill worker may lack the same focus as a healthy worker or be subject to distractions that do not ordinarily exist in performing a hazardous task, but to some extent worker's personal wellness is entirely subjective and workers may not be cognizant of health issues or may overestimate their ability to overcome them. Achieving a healthy workforce and compliance with applicable PPE protocols is therefore an ongoing concern from the safety perspective, and intentional or unintentional violations of PPE protocols that compromise the desired safety protocols can often be difficult to detect across a number of workers in different areas performing different tasks.

Computer-implemented monitoring systems exist that intelligently incorporate sensors in items of PPE to create a degree of situational awareness of risks posed to groups of workers, but known systems of this type generally lack capability to detect specific PPE compliance issues and wellness issues associated with particular individuals in the group in a particular environment. Improvements are therefore desired.

BRIEF DESCRIPTION OF THE DRAWINGS

Non-limiting and non-exhaustive embodiments are described with reference to the following FIGURES, wherein like reference numerals refer to like parts throughout the various drawings unless otherwise specified.

DETAILED DESCRIPTION

Figure 1A:
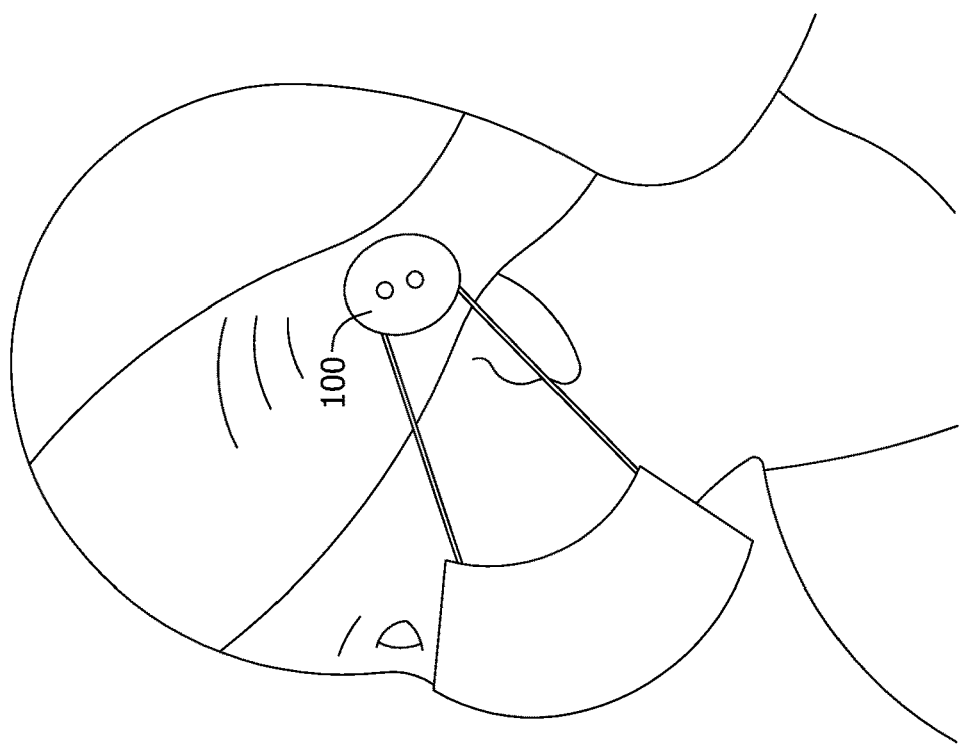
FIG. 1A shows exemplary personal protection equipment (PPE) monitoring assemblies that are worn on two individuals.
Figure 1A:
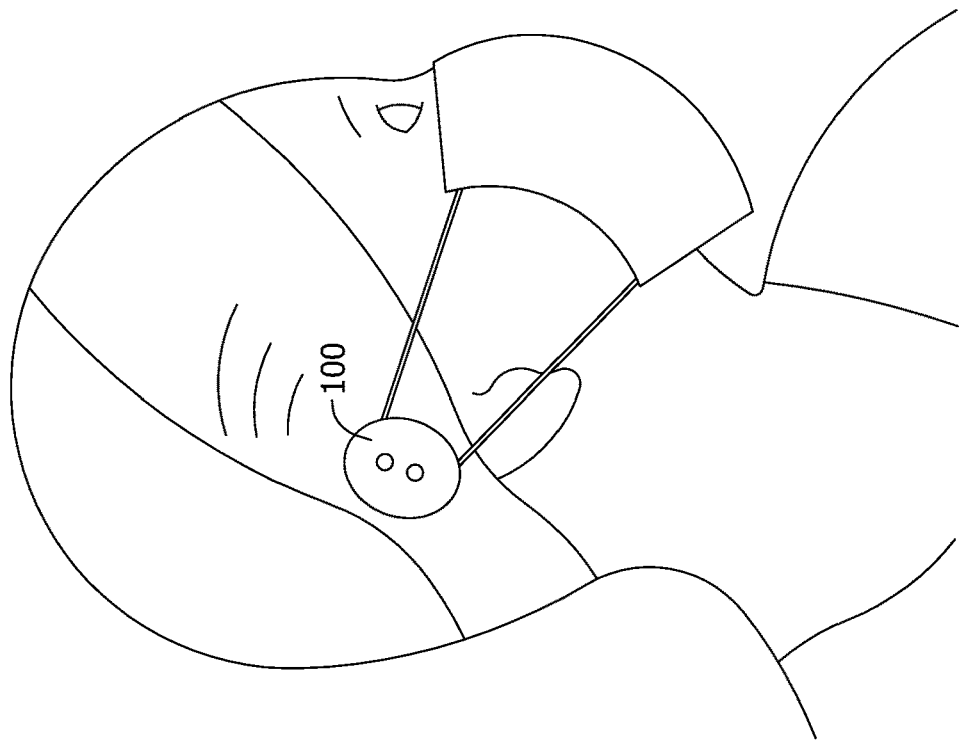

In order to understand the inventive concepts described below to their fullest extent, set forth below is a discussion of the state of the art and certain longstanding problems pertaining to personal wellness and personal protection equipment (PPE) compliance, followed by systems, assemblies, and methods addressing longstanding problems in the art.

It is a practical reality, in certain industries, that exposure of at least some workers to hazardous, or potentially hazardous, working conditions cannot be avoided. As one example, workers in the electrical industry, and more specifically those working in and around electrical power systems, must be trained in the appropriate use of PPE to mitigate possible electrical hazards with which they may face.

Aside from hazards associated with electrical shock and electrocution, electrical arc flash incidents are of particular concern. Electrical arcing, or current flow between two or more separated energized conductors, may be experienced when installing, servicing, and maintaining electrical systems. Arcing may occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the blast.

Arcing in an electrical power system may suddenly arise in various scenarios that cannot be reliably predicted. For example, insulation failure of components used in electrical systems, including but not limited to cables that interconnect electrical components and equipment may precipitate arcing, as well as a build-up of dust, impurities and corrosion on insulating surfaces. Sparks generated during operation of circuit breakers, during replacement of fuses, and closing electrical connections on faulted lines may also produce an arc. Damage to components and equipment from rodents and pest infestations may result in arcing conditions. Finally, arcing may be the result of unpredictable scenarios of human error such as dropping a tool onto energized conductors, accidental or incidental contact with energized components or equipment, and improper work procedures or mistake in following a procedure to completing a task.

Accordingly, PPE that is adequate or sufficient to provide at least a minimum level of protection to persons against potential electrical hazards has been developed for practically the entire human body, such as for example, electric shock, arc flash and arc blast. Persons wearing such personal protective equipment may be reasonably protected from incidental contact with energized conductors and potentially hazardous arc flash incidents and such PPE may avoid or reduce the likelihood of serious injury if such an arc flash incident occurs. Examples of PPE items may include a hard hat, a face shield, a flame resistant neck protector, ear protectors, a Nomex™ suit, insulated rubber gloves with leather protectors, and insulated leather footwear. Insulated tools may also be provided to complete certain tasks. Such personal protective equipment may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur. Different grades of PPE are available to protect against varying degree of risk presented. For example, in the case of electrical fuses that need replacement under energized circuit conditions, fuses of higher electrical ratings may pose a greater risk than fuses of lower electrical ratings, and therefore different amounts or types of personal protective equipment may be required for replacing one fuse, for example, than for replacing another fuse.

Similar considerations exist for other types of hazardous environments rendering similar PPE items desirable for use such as, for example only, petroleum refineries, petrochemical plants, grain silos, wastewater and/or treatment facilities, or other industrial facilities in which sustained or volatile conditions in the ambient environment may be present and may present a heightened risk of fire or explosion and/or a potential exposure to caustic chemicals and substances. Various different grades of PPE are available, which may be similar to or different from the grades of PPE designed for electrical hazards, to meet different risks posed by different situations.

In the healthcare environment, PPE items have been used to protect doctors and nurses in the treatment of patients having conditions that present health risks to healthcare providers when performing certain procedures. Different grades of PPE are available to meet different risks posed by different healthcare procedures. Paramedics, Emergency Medical Technicians (EMTs), Law Enforcement Offices, Firefighters and other emergency responders, as well as military personnel also have PPE items and protocols for responding to certain situations.

Wherever needed, PPE items are subject to appropriate and detailed safety protocols defining their use. Such protocols may detail specific items of PPE (e.g., protective suit, face shield, and gloves) needed for certain environments or for certain tasks within such environments, processes for obtaining the proper grade of PPE where multiple grades are available, processes for when such PPE items are required to be worn, processes for how such PPE items must be adorned and used, and processes for how PPE should be removed and cleaned for subsequent use. A number of practical challenges exist, however, in effective oversight of the proper use of PPE by personnel in a hazardous environment. Conscientious and well-trained workers will dutifully follow PPE protocols, but occasional misunderstanding, carelessness, and mistake may nonetheless occur with potentially severe consequences. Ensuring compliance, or detecting non-compliance, with applicable PPE protocols is therefore an ongoing concern.

For instance, a worker may have access to the proper PPE items to mitigate safety risks, but may nonetheless improperly use a PPE item in a non-compliant and therefore risky way. In the case of a face shield for example, a user may temporarily remove his or her face shield in a hazardous location, and present much risk in doing so without necessarily realizing it, or forget to put the face shield on at the required point of the procedure. Such incidents are very difficult to detect in order to allow an overseer of management of the facility to take proactive steps such as discipline or additional training for affected workers that are violating PPE protocols. Likewise, in the case of a positionable face shield that is selectively operable in an "up" position away from one's face or a "down" positon covering one's face, the face shield may inadvertently be in the wrong position (i.e., up instead of down) when performing a hazardous task, again presenting risk without the worker necessarily realizing it. Such incidents too tend to be very difficult to detect, and management therefore generally lacks opportunity to take appropriate actions to address concerning compliance issues, especially for workers performing tasks alone.

While a protocol for some procedures require a group of persons to perform tasks together such that any PPE non-compliance can be witnessed and reported by another worker, this is not always a reliable safeguard. Different workers may approach compliance issues from various perspectives that render compliance assessment subjective rather than objective. Certain workers may be reluctant to report, or may failure to recognize or understand that a compliance violation had actually occurred. In a rarer case, a worker or a group of workers may knowingly disregard aspects of a protocol that they do not appreciate.

Unless reliably and consistently detected, intentional or unintentional violations of PPE protocols may occur indefinitely to undermine important safety considerations, and across a number of workers in different areas performing different tasks, the challenges to oversee PPE compliance and detect non-compliance are multiplied. Smart, computer-implemented monitoring systems exist in the industrial realm that intelligently incorporate sensors in items of PPE to create a greater degree of situational awareness of worker safety across groups of workers, but known systems of this type generally lack a focus on evaluating specific PPE compliance issues of the type described above.

The onset of COVID-19 has raised new concerns and demands for the proper use of PPE and compliance with PPE protocols in environments that, prior to COVID-19, were generally not considered "hazardous" in a manner demonstrating a need for PPE. Such environments include areas of industrial facilities that are isolated from conventionally defined hazards, healthcare facilities and areas of healthcare facilities that were not previously considered to present high risk scenarios, elementary schools, middle schools, high schools, colleges and universities, offices and businesses of all types, shops and retail establishments, dining establishments, churches, and entertainment venues. Desirable PPE items are therefore prolifically present in these environments, but still subject to improper or non-compliant use in ways that are difficult to predict or control.

In the COVID era, individual personal wellness is an important consideration to ensure that no transmission of the virus occurs to nearby persons. In general, persons have COVID symptoms are strongly advised not to interact with other persons, but in some instances a person may have symptoms without necessarily realizing it. Temperature checks upon entry to an area are sometimes conducted as a course filter for screening purposes for personal entry to a space where other persons are present, but such temperature checks are limited in important aspects. Persons who passed the temperature check upon entry may develop a fever or other symptoms after the temperature check was made. In certain cases COVID illness or other illnesses may rapidly develop and may suddenly impair a person considerably, so early detection of symptoms can be important but are unfortunately rare. Especially so for persons that happen to be operating in a conventionally hazardous environment when a debilitating illness or health condition strikes, inability to detect such issues quickly may have significant undesirable consequences. Existing COVID protocols and electronic tools are generally reactive by nature rather than being proactive in such aspects.

Social distancing and masking are another important consideration to address risks posed by other persons possibly having the COVID virus or other conditions that can be contagiously spread or communicated to others. Face shields may suffice for the mask requirement, but for the reasons above are subject to misuse that can defeat the virus protection desired. Proximity sensing and contact tracing technologies have emerged to monitor social distancing aspects and collect information that may be helpful to maintain an outbreak of illness, but they are disadvantaged in some aspects for certain hazardous environments. For instance, smart-phone based contact tracing apps are of no aid in environments where smart phones are prohibited. Known contact tracing apps also operate independently of PPE systems and lack capability to assess wellness in a proactive manner.

For the reasons above, effective PPE monitoring systems are needed to more intelligently address PPE compliance with protocols that are COVID related and non-COVID related but nonetheless implicate important wellness and PPE compliance concerns to varying degrees.

Exemplary processor-based sensor systems are described herein that include embedded sensor technology in wearable personal protective equipment (PPE) devices. Combinations of sensors are provided in intelligent wearable PPE items worn by different persons to be monitored. The intelligent wearable PPE items are configured to connect and communicate with one another in a population of persons wearing the intelligent PPE items and also to a remote centralized system that aggregates data for review, analysis and oversight or individual personal wellness and PPE compliance issues in an objective and reliable manner allowing proactive management of health and safety risks in a community of persons.

In some embodiments, sensors are wearable separately from the wearable PPE items. In other words, PPE monitoring assemblies described herein may be installed on a wearable PPE item, or be wearable separately from the wearable PPE item. As used herein, being wearable is a device being configured to be worn on a person.

The combination of sensors provided in or with each intelligent wearable PPE item are operable in combination to provide signal inputs that may be processed and analyzed to collectively assess the wellness of the person wearing each intelligent PPE item, sense a proximity of each person wearing an intelligent PPE item to another person wearing an intelligent PPE item, assess compliant use of the PPE item by each wearer, provide feedback indicators to sensed parameters to persons wearing intelligent PPE items, record contact tracing information, and output data and information to a remote device that can be accessed by overseers via informational dashboard displays. Proactive steps may be taken by overseers to quickly and proactively respond to detected issues to minimize risks presented to a community of persons wearing the intelligent PPE items.

The sensor and monitoring system of the disclosure may be equally applicable to any of the areas listed above, or other areas that present similar issues or concerns, which are deemed hazardous in a non-conventional way solely because of COVID issues or other pandemic or epidemic outbreaks that compel a use of PPE and/or conventional areas deemed hazard in a conventional way due to risks such as shock, blasts, impact, fire, explosion, chemical burns, and all sorts of undesirable exposure to potentially harmful elements.

Figure 1B:
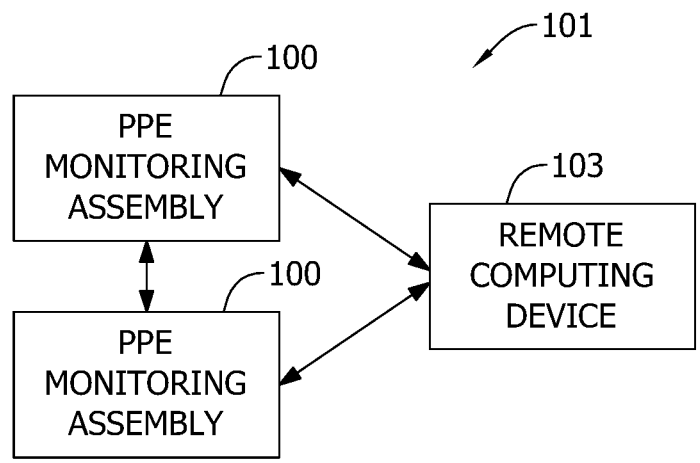
FIG. 1B is a schematic diagram of an exemplary PPE monitoring system.
Figure 1C:
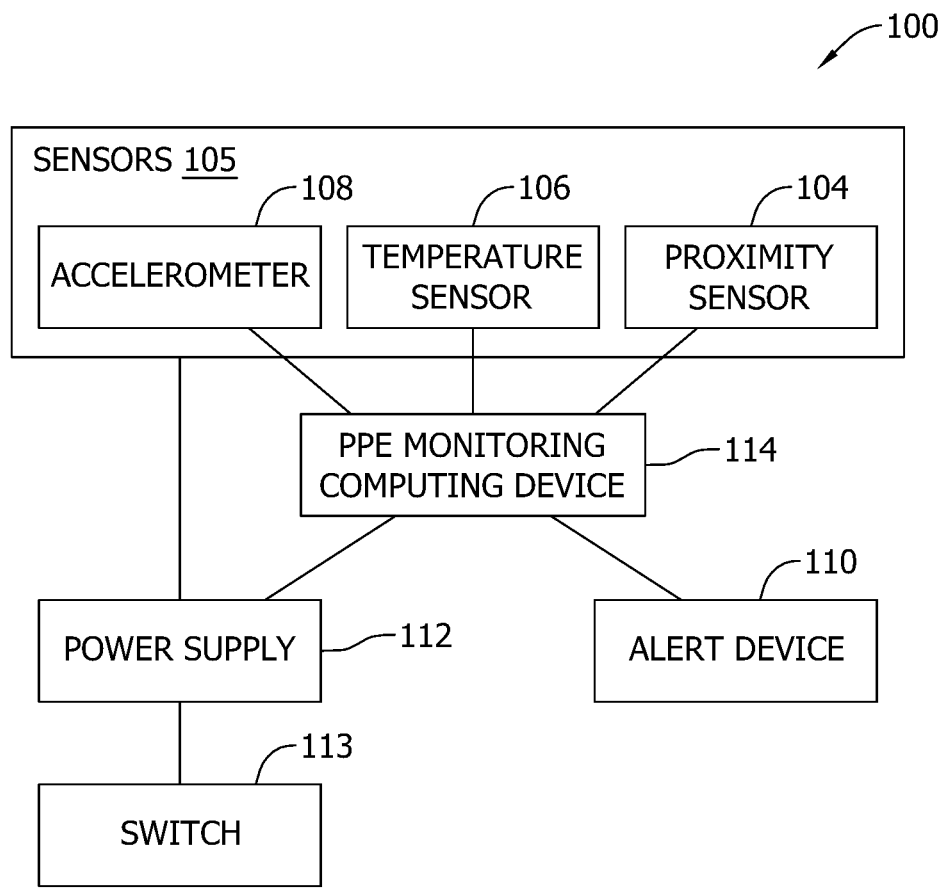
FIG. 1C is a schematic diagram of the exemplary PPE monitoring assembly shown in FIG. 1A.

The assemblies, systems, and methods disclosed herein integrate sensors and provide communications, alert, and/or feedback to the wearer to enhance safety and monitor compliance of PPE. Method aspects will be in part apparent and in part explicitly discussed in the following description FIGS. 1A-1C show an exemplary PPE monitoring system 101 (FIG. 1B) and an exemplary PPE monitoring assembly 100 (FIGS. 1A and 1C). FIG. 1A shows that two individuals wear the PPE monitoring assembly 100 for detecting and monitoring the proximity between the two individuals, as well as temperatures, positions, and motion of each of them. FIG. 1B shows a schematic diagram of the PPE monitoring system 101. FIG. 1C shows a schematic diagram of the PPE monitoring assembly 100. The PPE monitoring systems 101, PPE monitoring assemblies 100, and methods described herein are used to monitor and detect external hazards and compliance of PPE, and to enhance safety of the individual persons.

The PPE monitoring system 101 includes one or more PPE monitoring assemblies 100 (FIG. 1B). The PPE monitoring system 101 may further include a remote computing device 103 located remotely or separately from the PPE monitoring assembly 100. In some embodiments, the remote computing device 103 is a server computing device, and may be cloud-based. In other embodiments, the remote computing device 103 is a user computing device, such as a mobile device or a personal computer. The PPE monitoring assemblies 100 communicate with each other and with the remote computing device 103. The PPE monitoring assembly 100 may upload data of signals detected by the PPE monitoring assembly 100 and/or data stored in the PPE monitoring assembly 100 to the remote computing device 103, and/or receive command from the remote computing device 103. The communication may be periodic or in real time.

In the exemplary embodiment, the PPE monitoring assembly 100 includes one or more sensors 105 (FIG. 1C). The sensors may be a proximity sensor 104. The proximity sensor 104 may be a sensor using radio waves to detect proximity of objects. The proximity sensor 104 may be a Bluetooth low energy (BLE) received signal strength indicator (RSSI) that uses RSSI of the BLE radio waves to infer whether people are close together. The proximity sensor 104 acts as a transmitter and a receiver and detects a like device that communicates using the BLE radio waves. The proximity sensor 104 measures proximity to the like device, duration of the interaction, and amount of exposure of external hazards, using the RSSI of the BLE waves and identification of the other device based on information programmed in the BLE radio waves.

The PPE monitoring assembly 100 may include a temperature sensor 106 that measures a temperature of a wearer of the PPE monitoring assembly 100. The temperature sensor 106 may be an infrared temperature sensor. The PPE monitoring assembly 100 may also include an accelerometer 108 that measures the acceleration of motion of the wearer for detecting and tracking positions and motion of the wearer. In some embodiments, the PPE monitoring assembly 100 includes an electromagnetic field detector (not shown) for detecting whether electrical machinery is "live" or energized to address potential safety issues related to the machinery. For example, if the machinery is live, without proper PPE or compliance of PPE, a potential risk to the worker is present and the PPE monitoring assembly 100 alerts the wearer about the safety risk. Other sensors, such as sensors that measure humidity, pressure, oxygen, or carbon dioxide, may be included in the PPE monitoring assembly 100 to enable the PPE monitoring assembly 100 to function as described herein.

In the exemplary embodiment, the PPE monitoring assembly 100 further includes an alert device 110 that provides a visual, audio, and/or haptic alert. The alert device 110 may be a visual alert device such as a light-emitting diode (LED) indicator. The alert device 110 may include a haptic motor to produce a haptic alert such as a vibration.

In the exemplary embodiment, the PPE monitoring assembly 100 further includes a power supply 112. The power supply 112 may be a battery that provides electric power to components of the PPE monitoring assembly 100. In some embodiments, the PPE monitoring assembly 100 includes a switch 113 that allows a user to manually turn the power on or off.

In the exemplary embodiment, the PPE monitoring assembly 100 further includes a PPE monitoring computing device 114. In some embodiments, the computing device 114 includes a processor-based microcontroller including a processor and a memory device wherein executable instructions, commands, and control algorithms, as well as other data and information needed to satisfactorily operate the PPE monitoring assembly 100, are stored. The memory device may be, for example, a random access memory (RAM), and other forms of memory used in conjunction with RAM memory, including but not limited to flash memory (FLASH), programmable read only memory (PROM), and electronically erasable programmable read only memory (EEPROM).

In some embodiments, the PPE monitoring assemblies 100 does not include the PPE monitoring computing device 114. The sensors 105 directly trigger the alert device 110, and may directly communicate with the remote computing device 103.

In operation, the sensors 105 measure proximity, temperature, acceleration, and/or other signals and data about the wearer and/or the environment. The signals and data are transmitted to the PPE monitoring computing device 114 and/or to the remote computing device 103, which determines the status of the wearer and whether the wearer is at risk of external hazards or in need of assistance and may transmit a command in response to the detected signals. For example, the proximity sensor 104 monitors the distance of the wearer from another wearer of the PPE monitoring assembly 100 (FIG. 1A). If the two people are too close to each other, the alert device 110 of the PPE monitoring assembly 100 provides an alert, warning them that they are too close. In one example, if the temperature measured by the temperature sensor 106 exceeds a programmed or predetermined threshold, the alert device 110 is triggered and provides a visual, audio, or haptic alert. In another example, if the temperature sensor 106 reads a temperature that is outside the range of a body temperature, the PPE monitoring computing device 114 determines that the PPE monitoring assembly 100 is not being worn. The PPE monitoring computing device 114 may turn off the power supply 112 or reduce the power output from the power supply 112 to conserve energy. In one more example, the accelerometer 108 measures positions and motion of the wearer, and the PPE monitoring computing device 114 uses that data to determine situations such as falling of the wearer. Coupled with the data from the temperature sensor 106, the PPE monitoring computing device 114 determines that the wearer needs emergency assistance. The PPE monitoring computing device 114 may communicate with the remote computing device 103 to seek help or send out alert.

The PPE monitoring system 101 and the PPE monitoring assembly 100 may also be used to ensure compliance in donning PPE. For example, the PPE monitoring assembly 100 is worn with a face covering (FIG. 1A). When two people are too close to each other based on the signals from the proximity sensor 105, the person who wears the PPE but is not in compliance of PPE protocols such as not covering the mouth and/or nose would be at risk. Because the accelerometer 108 tracks positions, the PPE monitoring assembly 100 uses the data from the accelerometer 108 to determine whether the face covering is up or down and provide alert to the wearer about noncompliance of PPE.

In some embodiments, the PPE monitoring assembly 100 may record encounters of other wearers that are within a certain distance. When a wearer is found to be at risk, the list of encounters may be retrieved or uploaded to the remote computing device 103 such that further safety measures are taken for those other people, for example, the people in the list are notified and tested.

The PPE monitoring assembly 100 may communicate with other PPE monitoring assemblies 100 or remote computing device 103 through wired or wireless communication. The PPE monitoring assembly 100 may communicate wirelessly through Bluetooth technology using the BLE radio waves emitted by the proximity sensor 105. In other words, the BLE radio waves generated by the proximity sensor 105 are used to detect proximity of the persons, as well as communicating with other devices through the Bluetooth technology. The PPE monitoring assembly 100 may communicate with a mobile device and upload data detected and/or stored in the PPE monitoring computing device 114 to the mobile device. As a result, a person may look up the data on the mobile device. For example, parents may monitor the whereabouts and status of their children by looking up the data uploaded from the PPE monitoring assemblies 100 worn by the children. The functionality and communication of the PPE monitoring assembly 100, however, does not require a use of a mobile device, which is advantageous in environments where a mobile device is not allowed, for example, a hazardous environment.

Figure 2A:
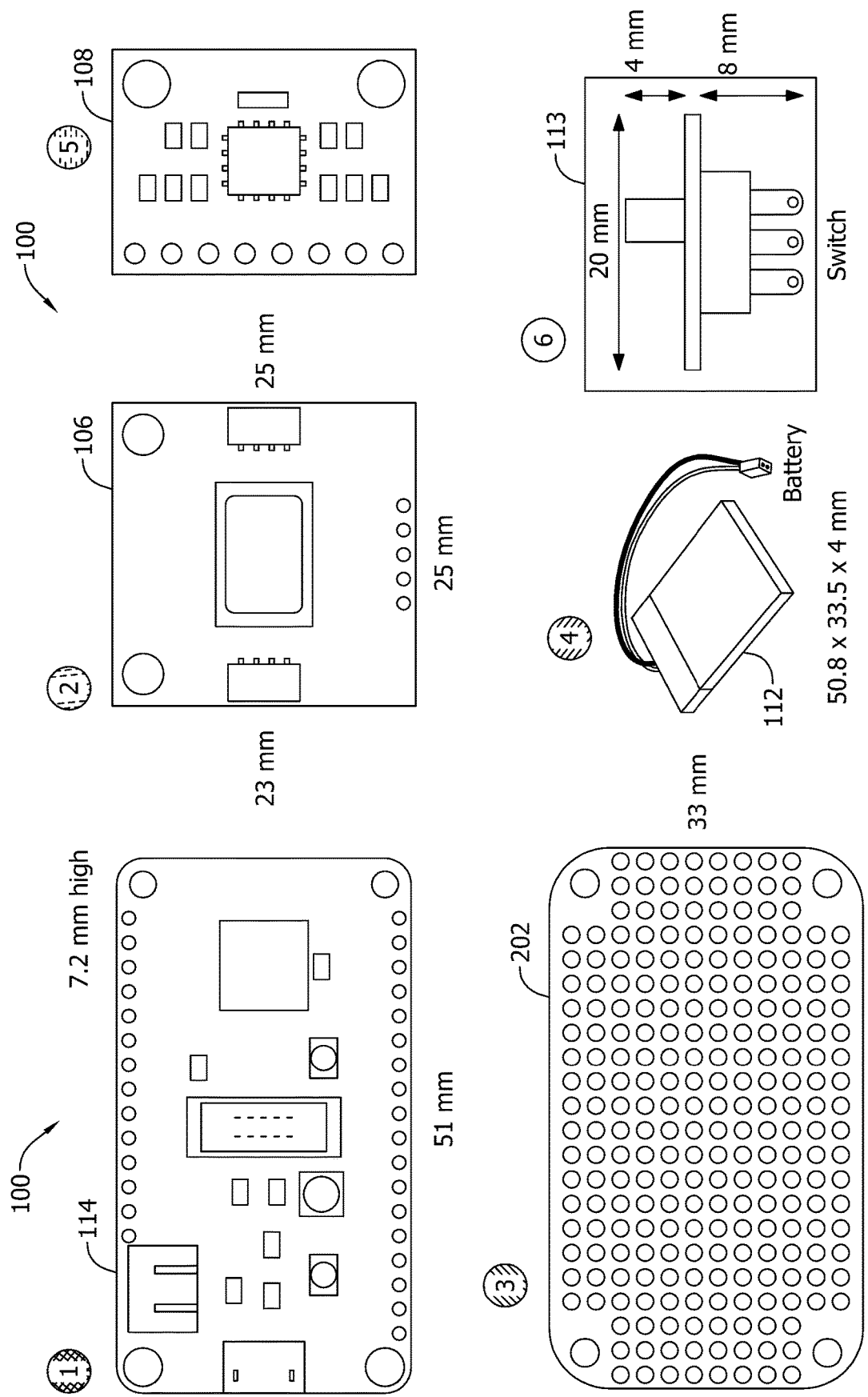
FIG. 2A shows exemplary components of the PPE monitoring assembly shown in FIG. 1C.
Figure 2B:
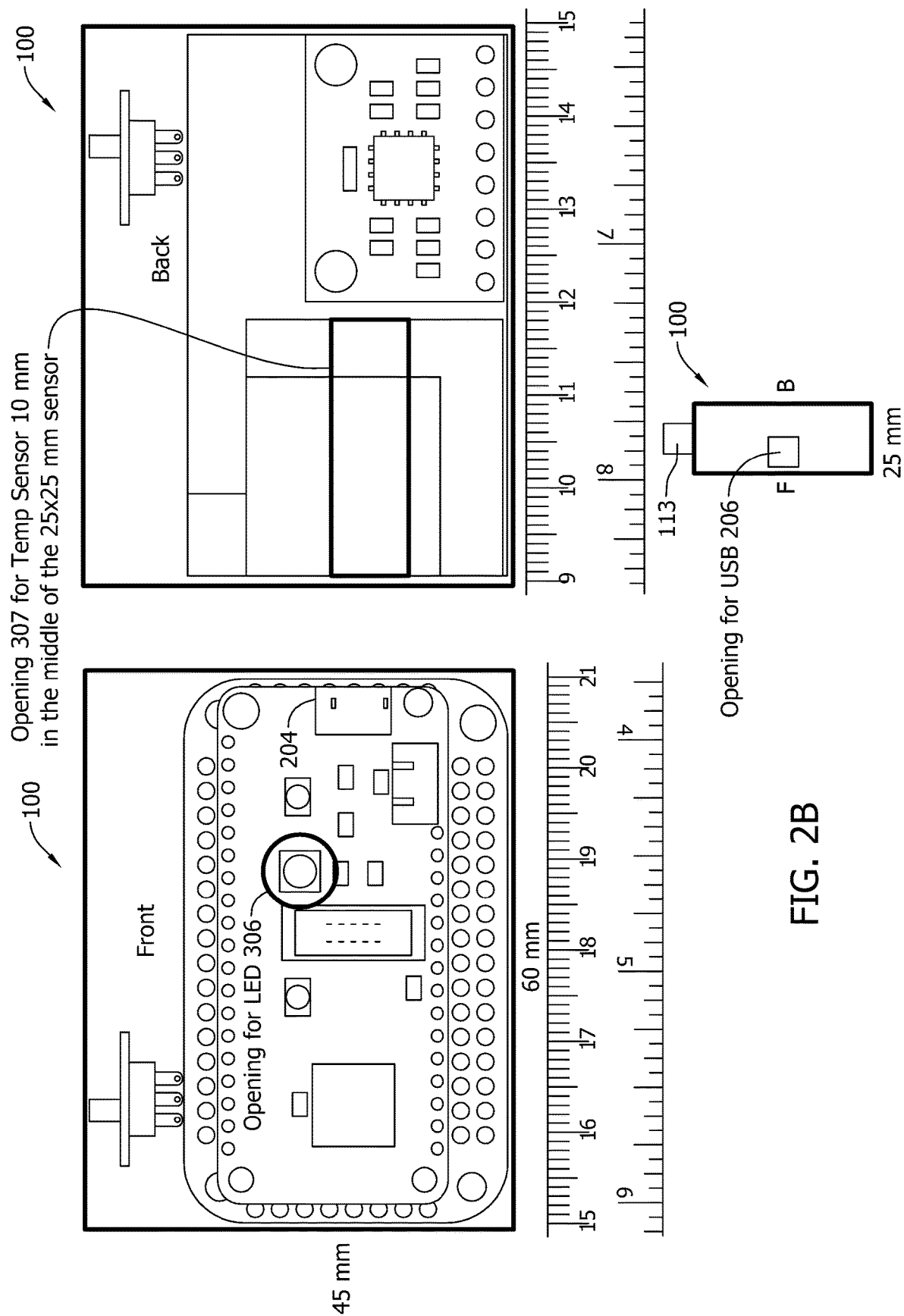
FIG. 2B are front, back, and side views of the PPE monitoring assembly shown in FIG. 2A.

FIGS. 2A and 2B show an exemplary PPE monitoring assembly 100. FIG. 2A shows exemplary components of the PPE monitoring assembly 100, and FIG. 2B shows front, back, and side views of the PPE monitoring assembly 100. Exemplary dimensions of the components are indicated in FIGS. 2A and 2B. As shown in FIG. 2B, the PPE monitoring assembly 100 has an exemplary dimension of length of approximately 60 mm, width of approximately 45 mm, and a thickness of approximately 25 mm. In the exemplary embodiment, the PPE monitoring assembly 100 includes a PPE monitoring computing device 114, a temperature sensor 106, an accelerometer 108, a power supply 112, and a switch 113. The PPE monitoring computing device 114 is a processor-based controller. The temperature sensor 106 is an infrared temperature sensor. The PPE monitoring assembly 100 may further include a protoboard 202 that provides connections between the components in assembling the PPE monitoring assembly 100. The PPE monitoring assembly 100 may further include a port 204 for a wired communication (FIG. 2B). For example, the port 204 is for connecting with a universal serial bus (USB). The PPE monitoring assembly 100 may include an opening 206 for accessing the port 204. As such, a USB cable connects the PPE monitoring assembly 100 with a remote computing device 103 and transfer data between the PPE monitoring assembly 100 and the remote computing device 103.

Figure 3A:
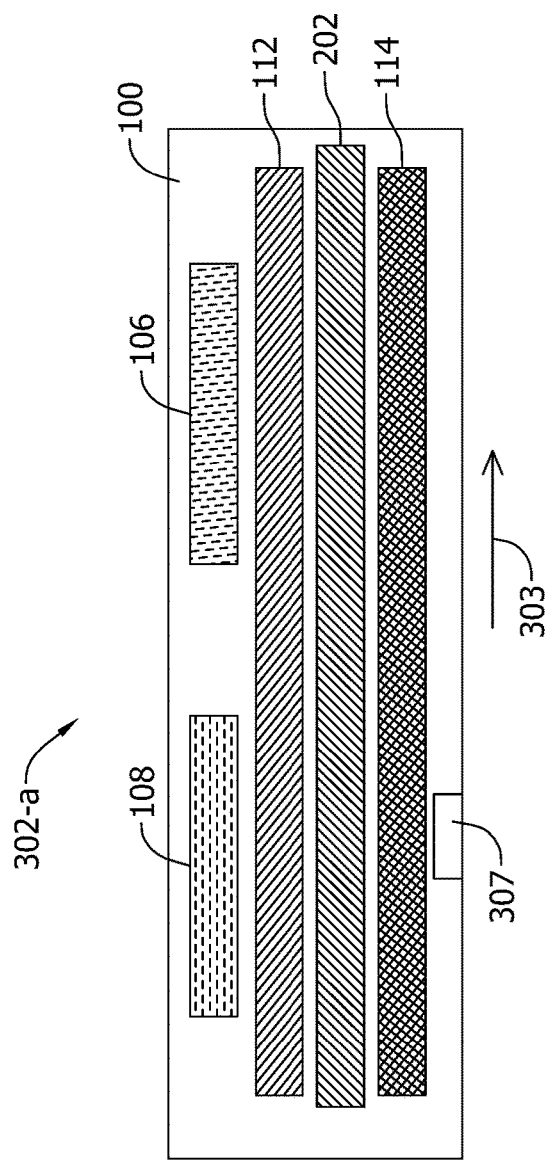
FIG. 3A is a schematic diagram of a cross-sectional view of the PPE monitoring assembly shown in FIG. 1C in an exemplary form factor.
Figure 3B:
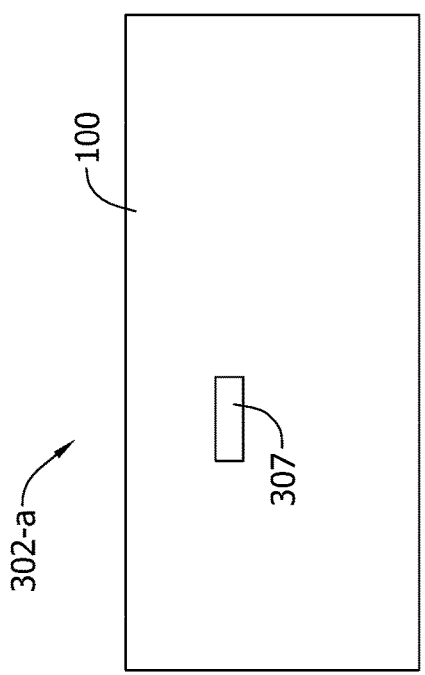
FIG. 3B is a rear view of the PPE monitoring assembly shown in FIG. 3A.

FIGS. 3A and 3B show an exemplary form factor 302-a of the PPE monitoring assembly 100, where the components of the PPE monitoring assembly 100 are stacked on top of each other such that the dimension of the PPE monitoring assembly 100 in the transverse direction 303 is reduced. FIG. 3A is a schematic diagram of a cross sectional view of the PPE monitoring assembly 100. FIG. 3B is a schematic diagram of a rear view of the PPE monitoring assembly 100. In the exemplary embodiment, the protoboard 202 is placed between the PPE monitoring computing device 114 and the power supply 112. The accelerometer 108 and the temperature sensor 106 are placed on top of the power supply 112. The back of the PPE monitoring assembly 100 includes an opening 307 for the temperature sensor 106 (also see FIG. 2B).

Figure 4B:
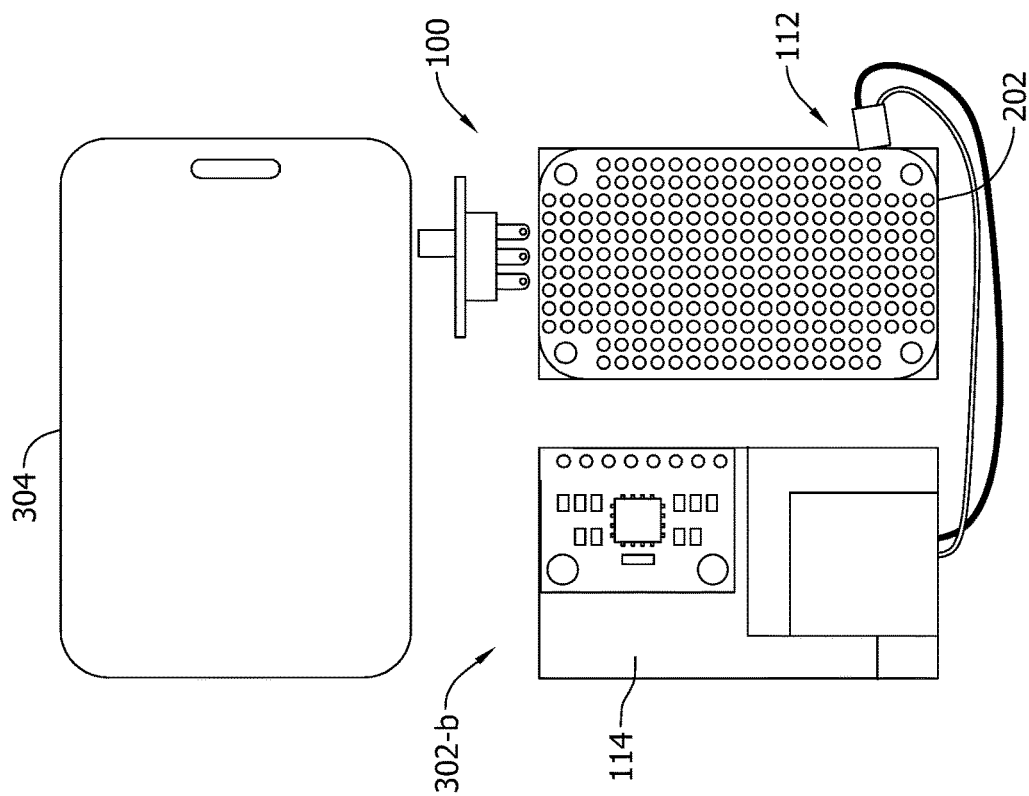
FIG. 4B is a rear view of the PPE monitoring assembly shown in FIG. 4A.
Figure 4A:
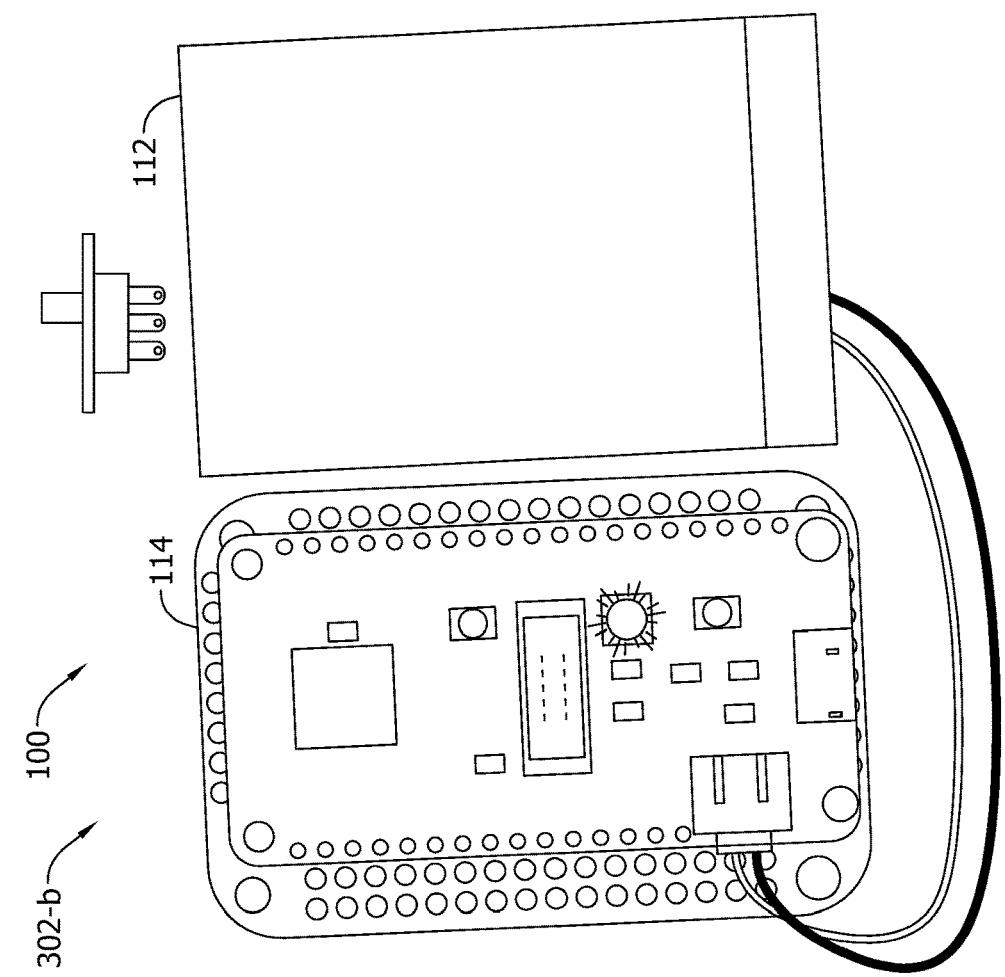
FIG. 4A is a front view of the PPE monitoring assembly shown in FIG. 1C in another exemplary form factor.

FIGS. 4A and 4B show another form factor 302-b of the PPE monitoring assembly 100. A security badge 304 is placed next to the PPE monitoring assembly 100 as a reference for the form factor 302-b. In the form factor 302-b, some components of the PPE monitoring assembly 100 are positioned side by side with one another. For example, the power supply 112 is positioned side by side with the PPE monitoring computing device 114. As a result, the thickness of the PPE monitoring assembly 100 is reduced.

Figure 5A:
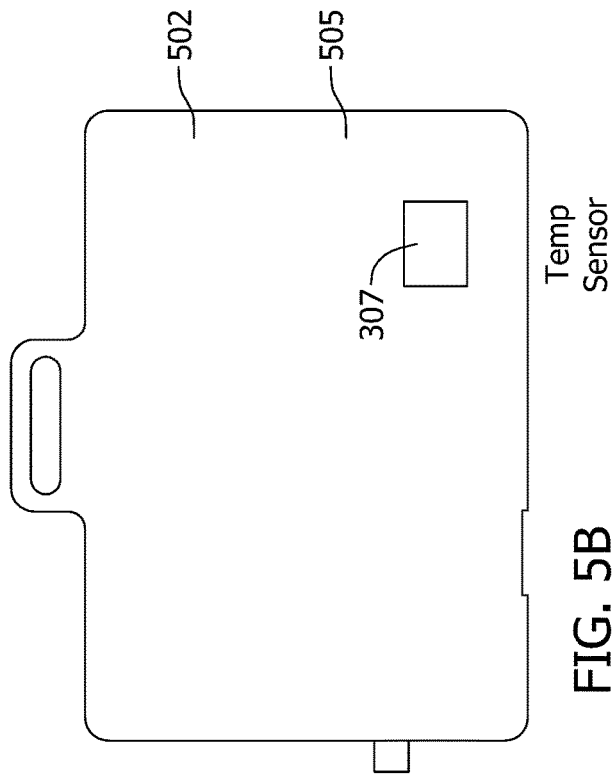
FIG. 5A is a front view of a housing of the PPE monitoring assembly shown in FIG. 1C.
Figure 5B:
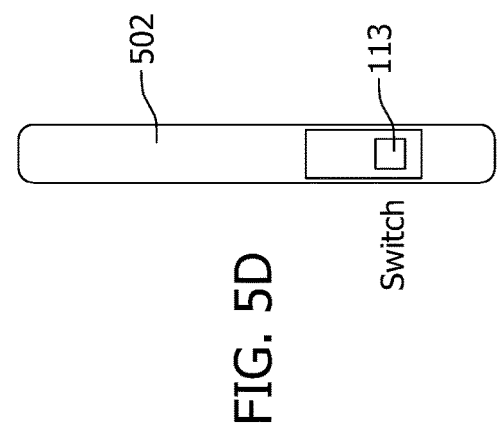
FIG. 5B is a rear view of the housing shown in FIG. 5A.
Figure 5C:
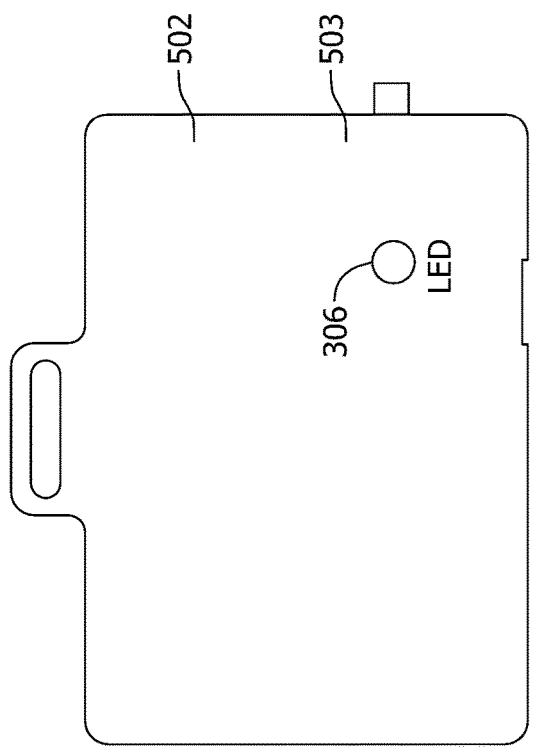
FIG. 5C is a side view of the housing shown in FIG. 5A.
Figure 5D:
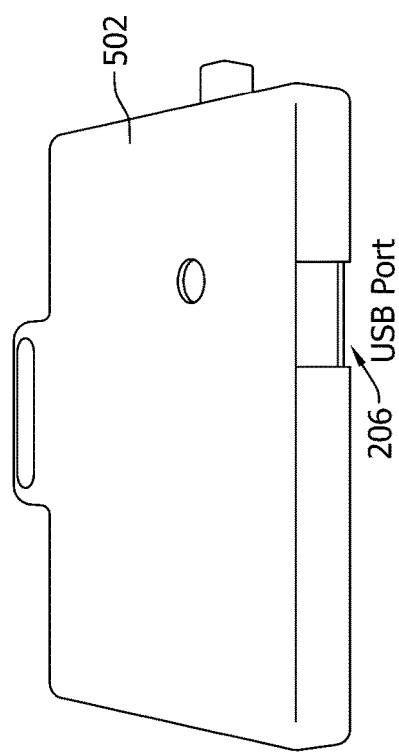
FIG. 5D is another side view of the housing shown in FIG. 5A.
Figure 6A:
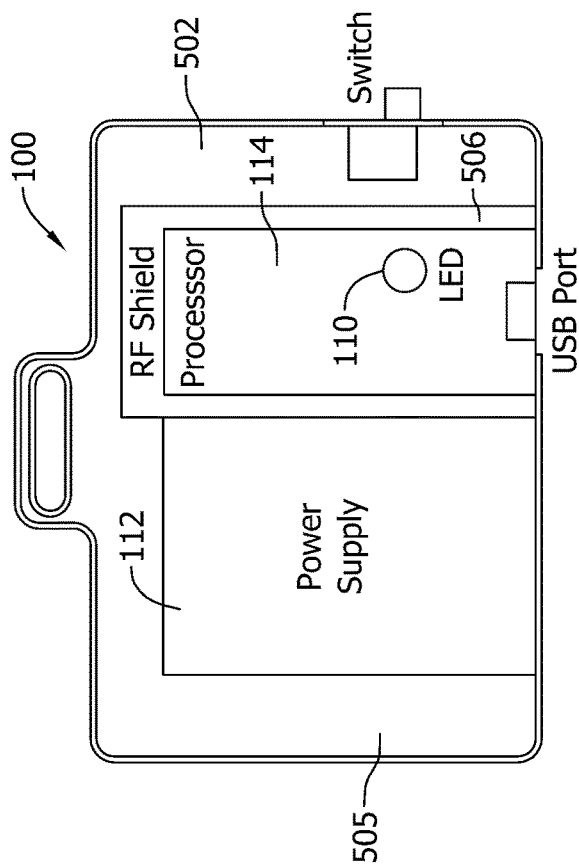
FIG. 6A is a schematic diagram of another exemplary PPE monitoring assembly shown in FIG. 1C with a front cover of the housing removed.
Figure 6B:
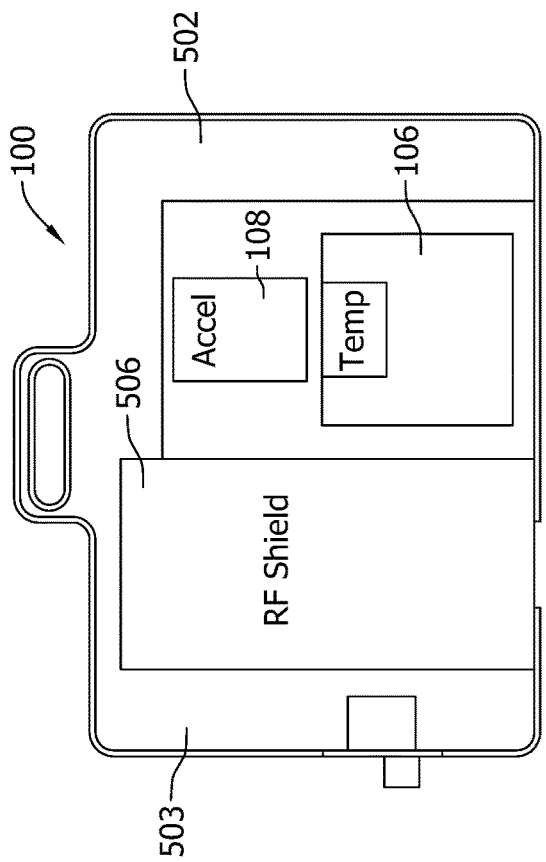
FIG. 6B is a schematic diagram of the PPE monitoring assembly shown in FIG. 6A with a rear cover of the housing removed.

The PPE monitoring assembly 100 may include a housing 502. FIGS. 5A-6B show the PPE monitoring assembly 100 including the housing 502 and formed as a badge that may be worn by hanging from the neck or being attached to the clothing of the wearer. The housing 502 includes a front cover 503 and a rear cover 505. FIGS. 5A-5B show front and rear views of the housing 502. FIG. 5C is a side review of the housing 502, showing the opening 206 for wired communication, such as a USB port 204 (see FIG. 2B). FIG. 5D is another side view of the housing 502 from the side of the switch 113. FIG. 6A is schematic diagram of the PPE monitoring assembly 100 with the front cover 503 of the housing 502 removed. FIG. 6B is a schematic diagram of the PPE monitoring assembly 100 with the rear cover 505 of the housing 502 removed. The housing 502 encloses the components of the PPE monitoring assembly 100, such as the alert device 110, the PPE monitoring computing device 114, the temperature sensor 106, the power supply 112, and the accelerometer 108. The housing 502 includes the opening 306 for the light emitted by the visual alert device 110 to shine through (FIG. 5A, and also see FIG. 2B). The housing 502 also includes an opening 307 for the temperature sensor 106 (FIG. 5B, and also see FIG. 2B). The opening 307 may be covered by an infrared-transparent seal to prevent dust, particles, or liquid from entering into the housing 502. When worn, the back side of the PPE monitoring assembly 100 faces the wearer such that the temperature sensor 106 faces the body of the wearer and detects the temperature of the wearer. For example, if the temperature sensor 106 is an infrared temperature sensor, the infrared light emitted by the wearer passes through the opening 307 and is detected by the infrared temperature sensor for measuring the temperature of the person. In one embodiment, the PPE monitoring assembly 100 includes a radio frequency (RF) shield 506 to reduce coupling of RF waves.

Figure 7A:
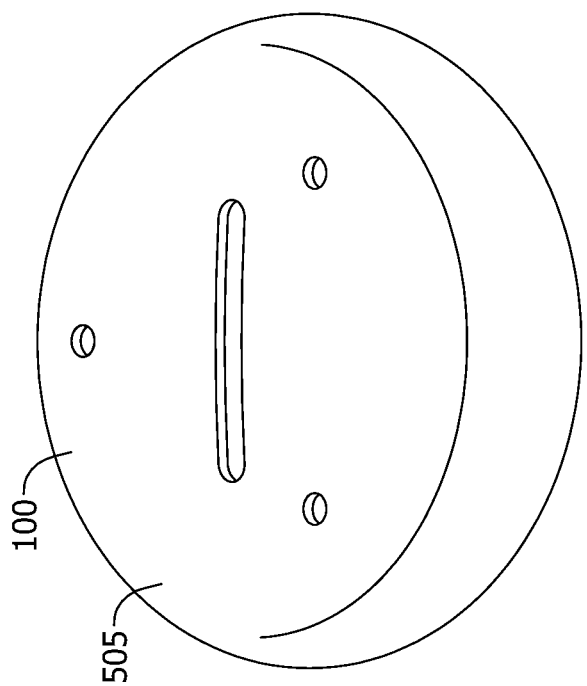
FIG. 7A is a top perspective view of an exemplary PPE monitoring assembly shown in FIG. 1C that is formed as a button.
Figure 7B:
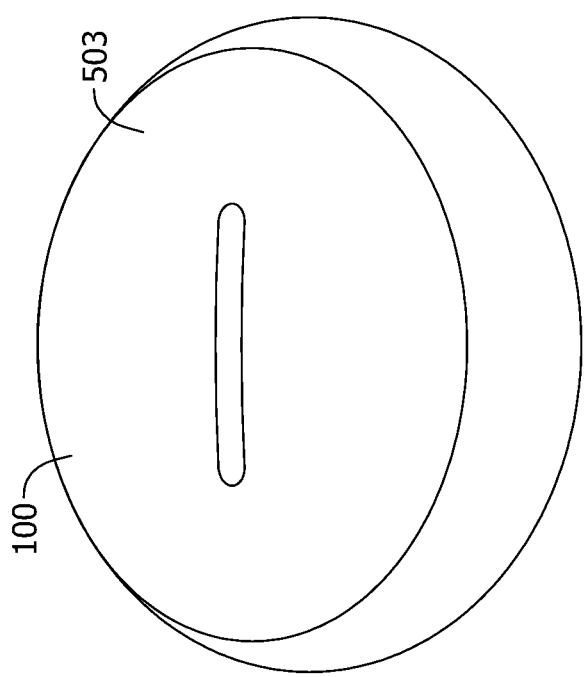
FIG. 7B is a bottom perspective view of the PPE monitoring assembly shown in FIG. 7A.

FIGS. 7A and 7B show the PPE monitoring assembly 100 is formed as a button. FIG. 7A shows a top perspective view of the PPE monitoring assembly 100 and FIG. 7B shows the bottom perspective view of the PPE monitoring assembly 100.

Figure 8B:
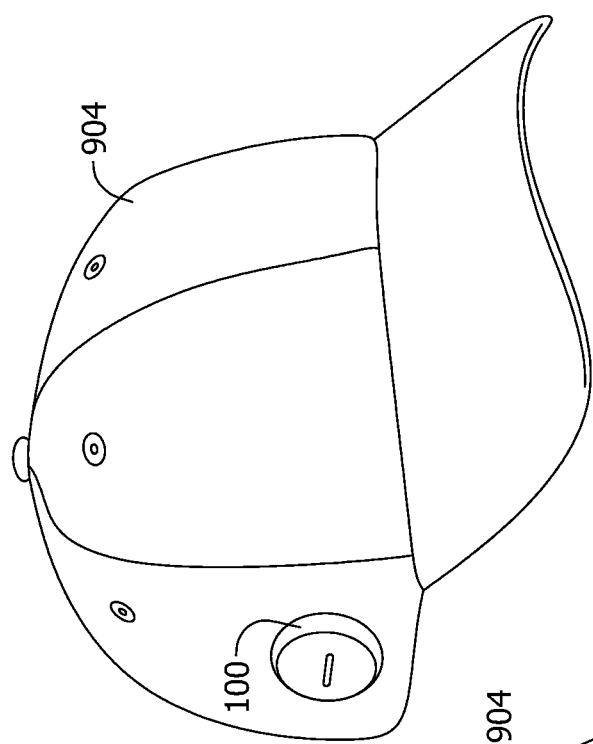
FIG. 8B shows the PPE monitoring assembly shown in FIG. 8A is coupled to a cap.
Figure 8C:
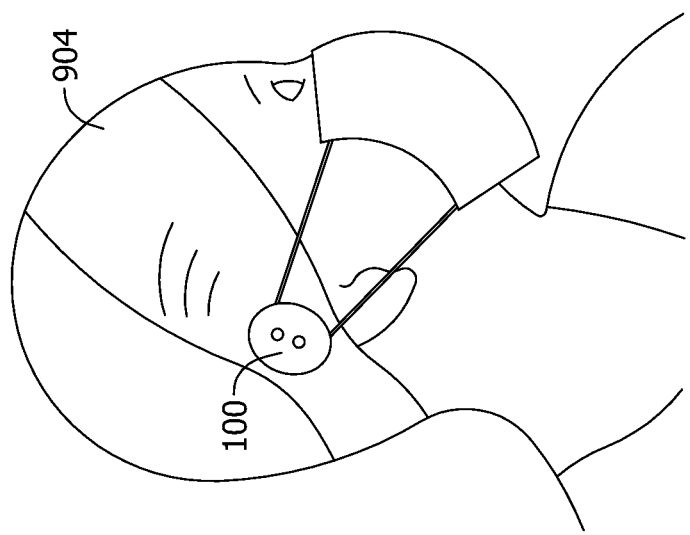
FIG. 8C shows the PPE monitoring assembly shown in FIG. 8A is coupled to a headband.
Figure 8A:
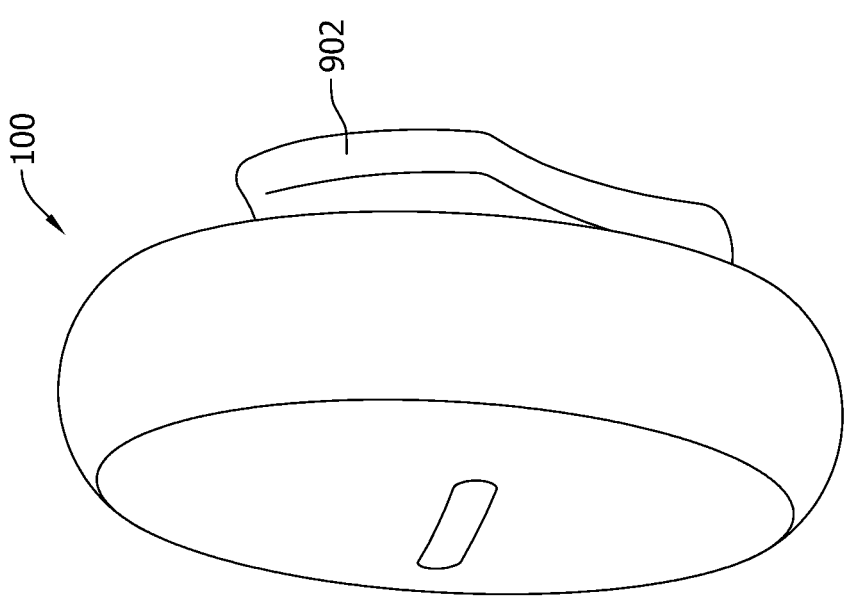
FIG. 8A is an exemplary PPE monitoring assembly shown in FIG. 1C that includes a fastener.

FIGS. 8A-8C show that the button PPE monitoring assembly 100 may further include a fastener 902 and is worn by being attached to various surfaces. In some embodiments, the fastener 902 is a twist-lock fastener, and the PPE monitoring assembly 100 may be attached to a surface by inserting the twist-lock fastener through an opening in the surface and twisting the twist-lock fastener to lock the PPE monitoring assembly 100 in place. The PPE monitoring assembly 100 may be removed by twisting the twist-lock fastener to unlock. In one example, the fastener 902 is a security pin lock, which includes a pin and a lock (not shown). The PPE monitoring assembly 100 may be removably attached to clothing 904 such as a cap (FIG. 8B) or a headband (FIG. 8C) by inserting the pin through the clothing 904 and locking the pin with the lock. The PPE monitoring assembly 100 may be attached to various surfaces by other fasteners or media such as a clip, hook-and-loop fasteners, or glue. The PPE monitoring assembly 100 may be configured to facilitate donning of the PPE. For example, the PPE monitoring assembly 100 is used for placing a face covering to alleviate stress around the ears, as well as for the PPE monitoring assembly 100 to monitor compliance of PPE (FIG. 8C). For example, the accelerometer 108 of the PPE monitoring assembly 100 monitors and tracks the position of the face covering and using the data from the accelerometer 108, the PPE monitoring assembly 100 determines the compliance of PPE and provides alert about noncompliance.

Figure 9B:
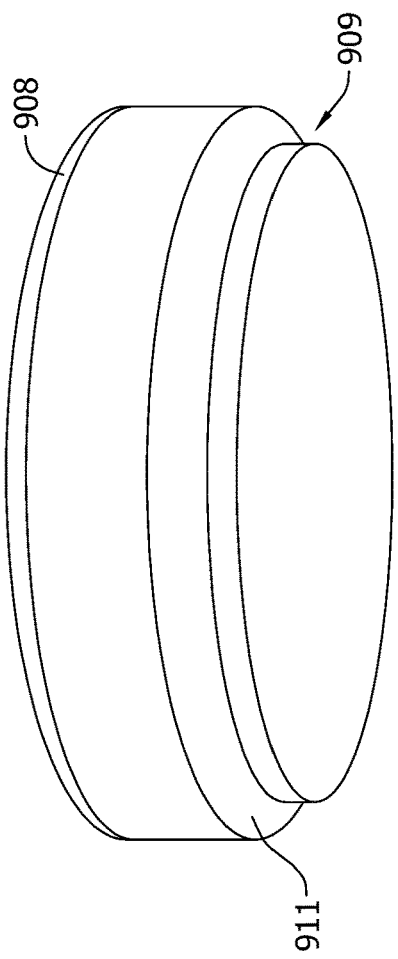
FIG. 9B is a bottom perspective view of another exemplary magnetic base.
Figure 9D:
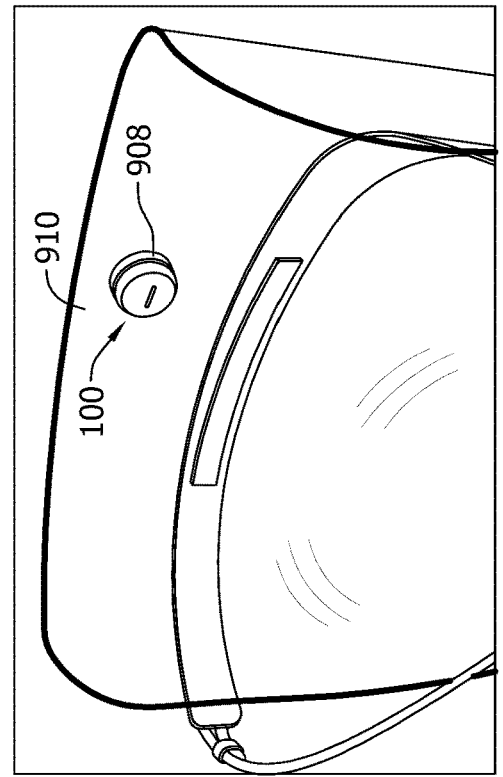
FIG. 9D shows that the PPE monitoring assembly shown in FIG. 1C is coupled to the magnetic base shown in FIG. 9C.
Figure 9A:
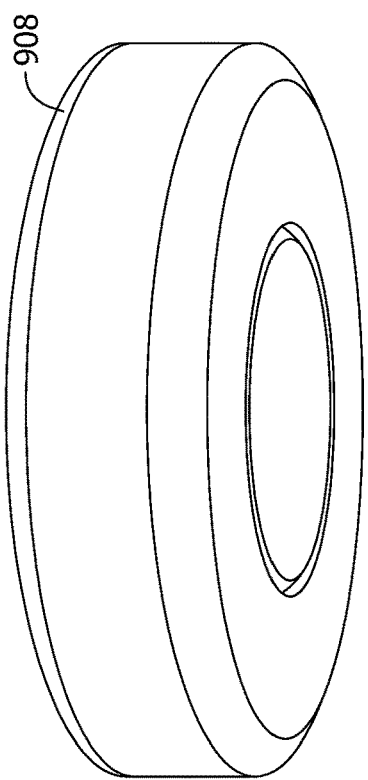
FIG. 9A is a bottom perspective view of an exemplary magnetic base.
Figure 9C:
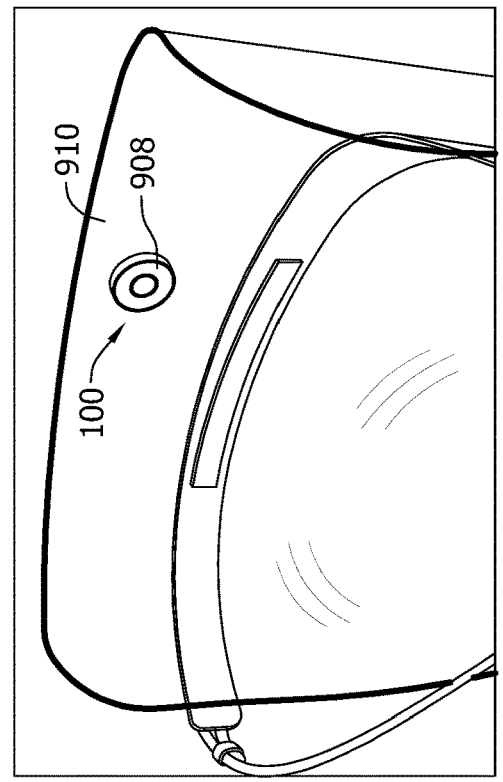
FIG. 9C shows the magnetic base shown in FIG. 9B coupled to PPE.

FIGS. 9A-9D show that a magnetic base 908 is used to couple the PPE monitoring assembly 100 on PPE 910, such as a face shield. FIG. 9A shows an exemplary magnetic base 908. FIG. 9B shows the magnetic base 908 may further include adhesive 909 positioned on a surface 911 of the magnetic base 908. In some embodiments, a side of the housing, such as the front cover 503 or the rear cover 505 (see FIGS. 7A and 7B), is fabricated with a ferrous material. To place the PPE monitoring assembly 100 to the PPE 910, the adhesive-backed magnetic base 908 is coupled to a surface of the PPE 910 through the adhesive (FIG. 9C). The PPE monitoring assembly 100 is coupled to the face shield 910 by placing the PPE monitoring assembly 100 on the opposite side of the PPE 910 and directly opposite the magnetic base 908, such that a part of the PPE 910 is sandwiched between the magnetic base 908 and the PPE monitoring assembly 100 (FIG. 9D). The PPE monitoring assembly 100 may be detached from the PPE 910 by pulling away from the magnetic base 908.

The PPE monitoring assemblies described herein may be part of PPE as part of a PPE item, being coupled to a PPE item, or being in a set of PPE. In some embodiments, the PPE monitoring assemblies are configured to monitor compliance of a protocol, where the PPE monitoring assemblies may or may not be part of PPE.

Figure 10:
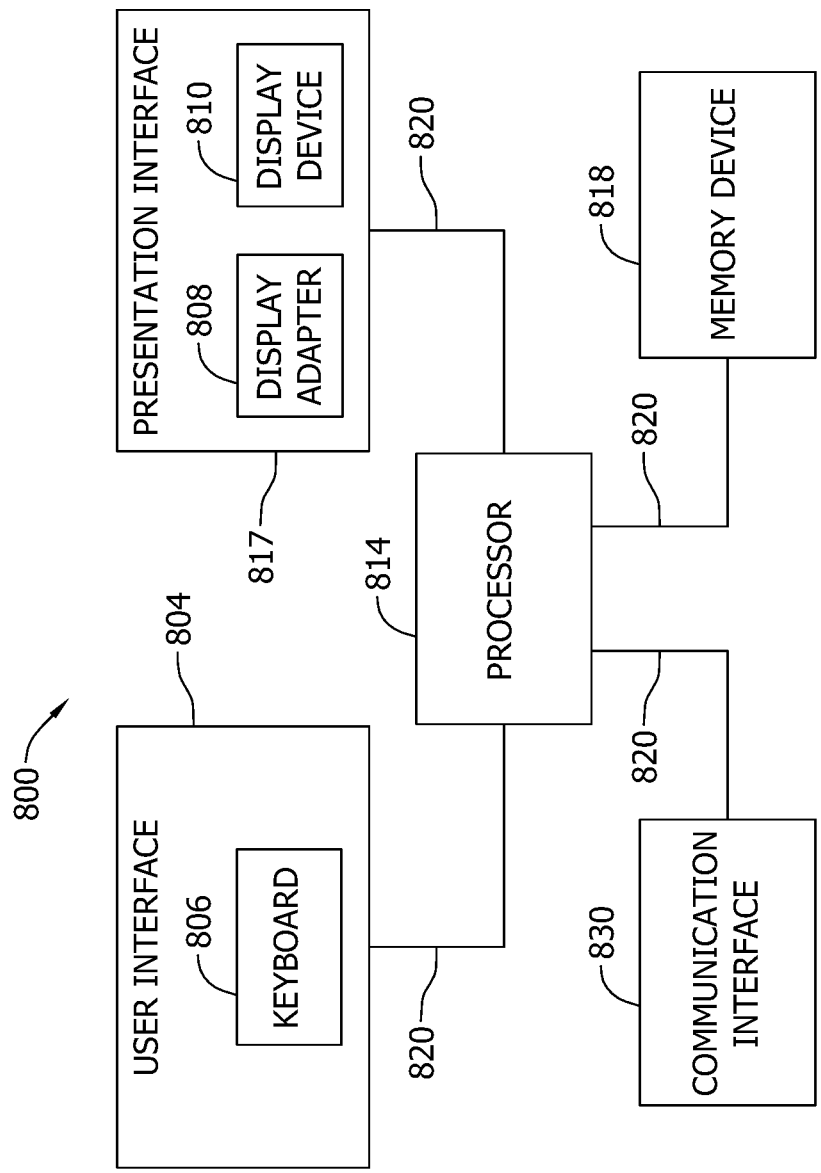
FIG. 10 is a schematic diagram of a user computing device.

The remote computing device 103 described herein may be any suitable user computing device 800 and software implemented therein. FIG. 10 is a block diagram of an exemplary computing device 800. In the exemplary embodiment, the computing device 800 includes a user interface 804 that receives at least one input from a user. The user interface 804 may include a keyboard 806 that enables the user to input pertinent information. The user interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computing device 800 includes a presentation interface 817 that presents information, such as input events and/or validation results, to the user. The presentation interface 817 may also include a display adapter 808 that is coupled to at least one display device 810. More specifically, in the exemplary embodiment, the display device 810 may be a visual display device, such as a cathode ray tube (CRT), a liquid crystal display (LCD), a light-emitting diode (LED) display, and/or an "electronic ink" display. Alternatively, the presentation interface 817 may include an audio output device (e.g., an audio adapter and/or a speaker) and/or a printer.

The computing device 800 also includes a processor 814 and a memory device 818. The processor 814 is coupled to the user interface 804, the presentation interface 817, and the memory device 818 via a system bus 820. In the exemplary embodiment, the processor 814 communicates with the user, such as by prompting the user via the presentation interface 817 and/or by receiving user inputs via the user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, the memory device 818 includes one or more devices that enable information, such as executable instructions and/or other data, to be stored and retrieved. Moreover, the memory device 818 includes one or more computer readable media, such as, without limitation, dynamic random access memory (DRAM), static random access memory (SRAM), a solid state disk, and/or a hard disk. In the exemplary embodiment, the memory device 818 stores, without limitation, application source code, application object code, configuration data, additional input events, application states, assertion statements, validation results, and/or any other type of data. The computing device 800, in the exemplary embodiment, may also include a communication interface 830 that is coupled to the processor 814 via the system bus 820. Moreover, the communication interface 830 is communicatively coupled to data acquisition devices.

In the exemplary embodiment, the processor 814 may be programmed by encoding an operation using one or more executable instructions and providing the executable instructions in the memory device 818. In the exemplary embodiment, the processor 814 is programmed to select a plurality of measurements that are received from data acquisition devices.

In operation, a computer executes computer-executable instructions embodied in one or more computer-executable components stored on one or more computer-readable media to implement aspects of the disclosure described and/or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 11:
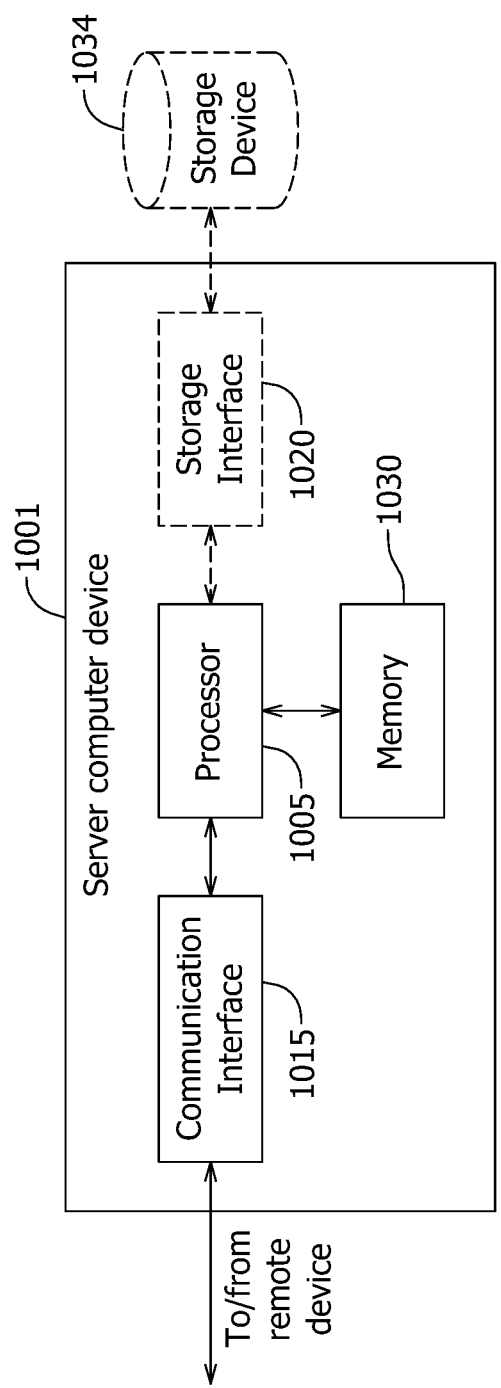
FIG. 11 is a schematic diagram of a server computing device.

FIG. 11 illustrates an exemplary configuration of a server computer device 1001 such as the remote computing device 103. The server computer device 1001 also includes a processor 1005 for executing instructions. Instructions may be stored in a memory area 1030, for example. The processor 1005 may include one or more processing units (e.g., in a multi-core configuration).

The processor 1005 is operatively coupled to a communication interface 1015 such that server computer device 1001 is capable of communicating with a remote device such as the PPE monitoring computing device 114, sensors 105, or another server computer device 1001. For example, communication interface 1015 may receive data from the PPE monitoring computing device 114 and the sensors 105, via the Internet.

The processor 1005 may also be operatively coupled to a storage device 1034. The storage device 1034 is any computer-operated hardware suitable for storing and/or retrieving data, such as, but not limited to, wavelength changes, temperatures, and strain. In some embodiments, the storage device 1034 is integrated in the server computer device 1001. For example, the server computer device 1001 may include one or more hard disk drives as the storage device 1034. In other embodiments, the storage device 1034 is external to the server computer device 1001 and may be accessed by a plurality of server computer devices 1001. For example, the storage device 1034 may include multiple storage units such as hard disks and/or solid state disks in a redundant array of inexpensive disks (RAID) configuration. The storage device 1034 may include a storage area network (SAN) and/or a network attached storage (NAS) system.

In some embodiments, the processor 1005 is operatively coupled to the storage device 1034 via a storage interface 1020. The storage interface 1020 is any component capable of providing the processor 1005 with access to the storage device 1034. The storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1005 with access to the storage device 1034.

At least one technical effect of the systems and methods described herein includes (a) a PPE monitoring assembly that includes a proximity sensor and a temperature sensor and provides alerts; (b) a PPE monitoring assembly including an accelerometer that tracks positions and motion of the wearer and allows reduction of power consumption during nonuse, monitoring compliance of PPE, and alert emergencies; (c) intelligent monitoring of PPE without requirement of a mobile device, which is advantageously suited for a hazardous environment.

An embodiment of a PPE monitoring assembly for a hazardous environment is provided. The PPE monitoring assembly includes one or more sensors embedded in a wearable item, the one or more sensors including at least one of a temperature sensor or an accelerometer configured to measure a parameter of at least one of a wearer of the wearable item or the hazardous environment. The PPE monitoring assembly further includes an alert device configured to provide an alert, and a monitoring computing device in communication with the one or more sensors and the alert device, the monitoring computing device including at least one processor in communication with at least one memory device.

Optionally, communication of the monitoring computing device does not require a use of a mobile device. The one or more sensors include the accelerometer configured to measure at least one of a position or motion of the wearer. The one or more sensors include the temperature sensor configured to measure a temperature of the wearer, and the monitoring computing device is programmed to determine whether the wearer has fallen based on measurements of the accelerometer, and if the wearer is determined to have fallen, determine whether emergency assistance is needed by coupling measurements of the accelerometer with a temperature of the wearer measured by the temperature sensor. The monitoring computing device is configured to monitor a protocol compliance of the wearer based on measurements of the one or more sensors. The one or more sensors include an electromagnetic field detector configured to detect whether electrical machinery is energized, and the monitoring computing device is configured to trigger the alert device if the electrical machinery is detected to be energized and a noncompliance of the protocol is determined. The one or more sensors include the temperature sensor, and the monitoring computing device is programmed to trigger the alert device if a temperature measured by the temperature sensor exceeds a predetermined threshold. Alternatively, the one or more sensors include the temperature sensor, the PPE monitoring assembly further includes a power supply, and the monitoring computing device is programmed to determine whether the PPE monitoring assembly is not being worn if a temperature measured by the temperature sensor is outside a range of a body temperature; and control power output of the power supply. The one or more sensors are embedded in a badge. Alternatively, the one or more sensors are embedded in a button. The PPE monitoring assembly is configured to be installed on a wearable PPE item. The PPE monitoring assembly includes a magnetic base configured to facilitate coupling the PPE monitoring assembly with the wearable PPE item. The magnetic base further includes adhesive on a surface of the magnetic base. The PPE monitoring assembly is configured to facilitate donning PPE and monitor compliance in donning of the PPE. The PPE monitoring assembly further includes a radio frequency (RF) shield configured to reduce RF coupling. The PPE monitoring assembly further includes a power supply, wherein the one or more sensors and the monitoring computing device are positioned at opposite sides of the power supply. Alternatively, the PPE monitoring assembly further includes a power supply, wherein the monitoring computing device are positioned side by side with the power supply. The PPE monitoring assembly further includes a housing surrounding the one or more sensors, the alert device, and the monitoring computing device, wherein the housing includes a front cover and a rear cover positioned opposite the front cover, the rear cover includes an opening, the temperature sensor positioned adjacent the rear cover and configured to detect a temperature of the wearer through the opening. The one or more sensors include a proximity sensor configured to detect proximity using radio waves, and the monitoring computing device communicates via the radio waves.

Another embodiment of a PPE monitoring assembly is provided. The PPE monitoring assembly includes one or more sensors embedded in a wearable PPE item, the one or more sensors including at least one of a temperature sensor or an accelerometer configured to measure a parameter of at least one of a wearer of the wearable PPE item or an environment wherein the wearer resides. The PPE monitoring assembly also includes an alert device configured to provide an alert and a PPE monitoring computing device in communication with the one or more sensors and the alert device, the PPE monitoring computing device including at least one processor in communication with at least one memory device.

Optionally, the one or more sensors include the temperature sensor, and the PPE monitoring computing device is programmed to trigger the alert device if a temperature measured by the temperature sensor exceeds a predetermined threshold. Alternatively, the one or more sensors include the temperature sensor, the PPE monitoring assembly further includes a power supply, and the PPE monitoring computing device is programmed to determine whether the PPE monitoring assembly is not being worn if a temperature measured by the temperature sensor is outside a range of a body temperature, and control power output of the power supply. The PPE monitoring computing device is configured to monitor a protocol compliance of the wearer based on measurements of the one or more sensors. The one or more sensors include the accelerometer configured to measure at least one of a position or motion of the wearer. The one or more sensors include the temperature sensor configured to measure a temperature of the wearer, and the PPE monitoring computing device is programmed to determine whether the wearer has fallen based on measurements of the accelerometer, and if the wearer is determined to have fallen, determine whether emergency assistance is needed by coupling measurements of the accelerometer with a temperature of the wearer measured by the temperature sensor. The one or more sensors include an electromagnetic field detector configured to detect whether electrical machinery is energized, and the PPE monitoring computing device is configured to trigger the alert device if the electrical machinery is detected to be energized and noncompliance in donning PPE is determined. The one or more sensors are embedded in a badge. Alternatively, the one or more sensors are embedded in a button. The PPE monitoring assembly is configured to be installed on the wearable PPE item. The PPE monitoring assembly includes a magnetic base configured to facilitate coupling the PPE monitoring assembly with the wearable PPE item. The magnetic base further includes adhesive on a surface of the magnetic base. The PPE monitoring assembly is configured to facilitate donning PPE and monitor compliance in donning of the PPE. The PPE monitoring assembly further includes a radio frequency (RF) shield configured to reduce RF coupling. The PPE monitoring assembly further includes a power supply, wherein the one or more sensors and the PPE monitoring computing device are positioned at opposite sides of the power supply. Alternatively, the PPE monitoring assembly further includes a power supply, wherein the PPE monitoring computing device are positioned side by side with the power supply. The PPE monitoring assembly further includes a housing surrounding the one or more sensors, the alert device, and the PPE monitoring computing device, wherein the housing includes a front cover and a rear cover positioned opposite the front cover, the rear cover includes an opening, the temperature sensor positioned adjacent the rear cover and configured to detect a temperature of the wearer through the opening. The one or more sensors include a proximity sensor configured to detect proximity using radio waves, and the PPE monitoring computing device communicates via the radio waves.

An embodiment of a PPE monitoring system is provided. The PPE monitoring system includes a first PPE monitoring assembly and a second PPE monitoring assembly. The first PPE monitoring assembly includes one or more first sensors embedded in a first wearable item, the one or more first sensors including at least one of a temperature sensor or an accelerometer configured to measure a parameter of at least one of a first wearer of the first wearable item or an environment wherein the first wearer resides. The first PPE monitoring assembly also includes a first alert device configured to provide a first alert, and a first PPE monitoring computing device in communication with the one or more first sensors and the first alert device, the first PPE monitoring computing device including at least one processor in communication with at least one memory device. The second PPE monitoring assembly is in communication with the first PPE monitoring assembly, the second PPE monitoring assembly including one or more second sensors embedded in a second wearable item, the one or more second sensors including at least one of a temperature sensor or an accelerometer configured to measure a parameter of at least one of a second wearer of the second wearable item or an environment wherein the second wearer resides. The second PPE monitoring assembly also includes a second alert device configured to provide a second alert, and a second PPE monitoring computing device in communication with the one or more second sensors and the second alert device, the second PPE monitoring computing device including at least one processor in communication with at least one memory device. The first PPE monitoring assembly and the second PPE monitoring assembly are in communication with a remote computing device positioned remotely from the first PPE monitoring assembly and the second PPE monitoring assembly.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments certain components in the assemblies described may be omitted to accommodate particular types of connectors and supports, or the needs of particular installations, while still providing cost effective connector assemblies for electrical wiring or cabling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personal protection equipment (PPE) monitoring assembly for a hazardous environment, comprising:
   one or more sensors embedded in a wearable item, the one or more sensors including at least one of a temperature sensor configured to measure a temperature of a wearer of the wearable item and an accelerometer configured to measure a motion associated with the wearer;
   an alert device configured to provide an alert; and
   a monitoring computing device in communication with the one or more sensors and the alert device, the monitoring computing device comprising at least one processor in communication with at least one memory device, wherein the monitoring computing device is configured to determine that emergency assistance is needed based on measurements of the accelerometer and the temperature measured by the temperature sensor.

2. The PPE monitoring assembly of claim 1, wherein communication of the monitoring computing device does not require a use of a mobile device.

3. The PPE monitoring assembly of claim 1, wherein the monitoring computing device is further configured to:
   determine whether the wearer has fallen based on measurements of the accelerometer.

4. The PPE monitoring assembly of claim 1, wherein the monitoring computing device is configured to monitor whether the wearer is in compliance to a protocol based on measurements of the one or more sensors.

5. The PPE monitoring assembly of claim 4, wherein the one or more sensors include an electromagnetic field detector configured to detect whether electrical machinery is energized, and the monitoring computing device is configured to:
   trigger the alert device upon determining that the electrical machinery is energized and the protocol is in noncompliance.

6. The PPE monitoring assembly of claim 1, wherein the one or more sensors include the temperature sensor, and the monitoring computing device is programmed to:
   trigger the alert device upon determining that a temperature measured by the temperature sensor exceeds a predetermined threshold.

7. The PPE monitoring assembly of claim 1, wherein the one or more sensors include the temperature sensor, the PPE monitoring assembly further includes a power supply, and the monitoring computing device is programmed to:
   determine whether the PPE monitoring assembly is being worn by the wearer based on determining that a temperature measured by the temperature sensor is outside a range of a body temperature; and
   control power output of the power supply.

8. The PPE monitoring assembly of claim 1, wherein the one or more sensors are embedded in a badge.

9. The PPE monitoring assembly of claim 1, wherein the one or more sensors are embedded in a button.

10. The PPE monitoring assembly of claim 1, wherein the PPE monitoring assembly is configured to be installed on a wearable PPE item.

11. The PPE monitoring assembly of claim 10, wherein the PPE monitoring assembly includes a magnetic base configured to facilitate coupling the PPE monitoring assembly with the wearable PPE item.

12. The PPE monitoring assembly of claim 11, wherein the magnetic base further comprises adhesive on a surface of the magnetic base.

13. The PPE monitoring assembly of claim 1, wherein the PPE monitoring assembly is configured to facilitate donning PPE and monitor compliance in donning of the PPE.

14. The PPE monitoring assembly of claim 1, further comprising a radio frequency (RF) shield configured to reduce RF coupling.

15. The PPE monitoring assembly of claim 1, further comprising a power supply, wherein the one or more sensors and the monitoring computing device are positioned at opposite sides of the power supply.

16. The PPE monitoring assembly of claim 1, further comprising a power supply, wherein the monitoring computing device are positioned side by side with the power supply.

17. The PPE monitoring assembly of claim 1, further comprising a housing surrounding the one or more sensors, the alert device, and the monitoring computing device, wherein the housing includes a front cover and a rear cover positioned opposite the front cover, the rear cover includes an opening, the temperature sensor positioned adjacent the rear cover and configured to detect a temperature of the wearer through the opening.

18. The PPE monitoring assembly of claim 1, wherein the one or more sensors include a proximity sensor configured to detect proximity using radio waves, and the monitoring computing device communicates via the radio waves.

* * * * *